July 5, 1966 G. D. CHENEY 3,259,889

MAGNETIC DATA STORAGE DRUM POSITIONED BY CENTRIFUGAL MEANS

Filed June 1, 1962 5 Sheets-Sheet 1

INVENTOR.
GEORGE D. CHENEY
BY
Bower & Patalidis
ATTORNEYS

MAGNETIC DATA STORAGE DRUM POSITIONED BY CENTRIFUGAL MEANS

Filed June 1, 1962 5 Sheets-Sheet 2

INVENTOR.
GEORGE D. CHENEY
BY
Bower & Patalidis
ATTORNEYS

MAGNETIC DATA STORAGE DRUM POSITIONED BY CENTRIFUGAL MEANS

Filed June 1, 1962 5 Sheets-Sheet 3

INVENTOR.
GEORGE D. CHENEY
BY
Bower & Patalidis
ATTORNEYS

MAGNETIC DATA STORAGE DRUM POSITIONED BY CENTRIFUGAL MEANS

Filed June 1, 1962 5 Sheets-Sheet 4

INVENTOR.
GEORGE D. CHENEY
BY
Bower & Patalidis
ATTORNEYS

July 5, 1966 G. D. CHENEY 3,259,889

MAGNETIC DATA STORAGE DRUM POSITIONED BY CENTRIFUGAL MEANS

Filed June 1, 1962 5 Sheets-Sheet 5

INVENTOR.
GEORGE D. CHENEY
BY
Bower & Patalidis
ATTORNEYS 3,259,889
MAGNETIC DATA STORAGE DRUM POSITIONED BY CENTRIFUGAL MEANS

George D. Cheney, Orchard Lake, Mich., assignor to Ex-Cell-O Corporation, Detroit, Mich.

Filed June 1, 1962, Ser. No. 199,422
16 Claims. (Cl. 340—174.1)

This invention relates to magnetic data storage drum systems and more particularly to mechanisms arranged to linearly and axially displace a rotatable frusto-conical drum from a position of rest in static condition, affording a substantial clearance or air gap between the magnetizable surface on the drum and the pole pieces of associated transducer heads, to an operative position in dynamic condition, affording a minimal air gap for improved recording and playback signals.

In magnetic recording on drums, discs and the like, it is a preferred practice to prevent actual physical contact between the transducer heads and the magnetizable surface in order to avoid wear and prevent damage to the components. It is also desirable to position the flux emitting ends of the magnetic transducers in such a way as to establish a very narrow clearance or air gap between the flux emitting ends and the record surface in order to obtain high quality recording and playback, together with high packing or "bit" density per inch of track.

In United States patent application Serial No. 649,984, filed April 1, 1957 by Hugh M. Taft, which has now issued as Patent No. 3,134,969, and in United States patent application Serial No. 777,741 filed December 2, 1958 by Darrell L. Mitchell, which has now issued as Patent No. 3,061,822, frusto-conical drums are shown and described which are capable of axial adjustment by manual means. Due to the conicity of the peripheral surface of the drum, a certain amount of longitudinal axial adjustments results in a proportional minute variation of the transducer head to record surface air gap. In patent application Serial No. 106,216, filed April 28, 1961 and now Patent No. 3,197,750, by Joseph E. Smith, Jr., there is described a means of adjusting the air gap by longitudinally displacing transducer heads mounted on a cylindrical housing associated with a frusto-conical record support or alternately by longitudinally displacing transducer heads mounted on a frusto-conical surface associated with a cylindrical record support.

The present invention provides a frusto-conical record support which is automatically axially displaced of an amount dependent from its rotational velocity, longitudinally moving the record surface thereon in such a manner as to decrease the clearance or air gap between the record surface and the transducer heads during dynamic condition. The drum of the invention may be used with stationary transducer heads, or better yet, it may be used in combination with transducer heads such as those which are adapted to ride on a laminar film of gas fluid clinging to the record surface and set in motion by the rotation thereof, sometimes called "flying" heads. Transducer heads of this character are described in a copending patent application Serial No. 37,688 filed June 21, 1960, now Patent No. 3,187,315, and in patent applications Serial No. 772,861 filed November 10, 1958 by Joseph E. Smith, Jr., now Patent No. 3,187,313, Serial No. 86,198 filed January 31, 1961 by Joseph E. Smith, Jr., now Patent No. 3,187,112, Serial No. 132,160 filed August 17, 1961 by Leonard S. Bleininger, now abandoned, Serial No. 137,651 filed September 12, 1961 by George D. Cheney et al., Patent No. 3,140,362, and Serial No. 142,148 filed October 2, 1961 by George D. Cheney et al. now Patent No. 3,245,063. When employed in combination with transducer heads described in the above mentioned applications, the present invention presents the advantage of a simplified construction of the magnetic data storage device requiring no auxiliary means for bringing the transducer heads in close proximity to the record surface after the latter has reached its operational velocity, or the necessity of starting the apparatus with the transducer heads in contact and rubbing against the record surface until a laminar film of gas fluid has been developed which is strong enough to support the heads against their own weight and against the force of the resilient means normally urging the heads toward the record surface. By use of the teachings of the present invention, a magnetic data storage drum can be started with the transducer heads out of contact from the record surface and accelerated to a velocity sufficient to develop a laminar film of gas fluid. At this time, the drum of the invention is automatically axially displaced, thereby bringing the record surface in close proximity to the magnetic heads which are then supported by a gas bearing at the appropriate distance away from the record surface. The invention also provides an automatic "fail safe" mechanism which axially displaces the drum in an opposite direction, as soon as the angular velocity falls below a predetermined value, thereby preventing accidental damaging contact between the transducer heads and the record medium.

Other objects and advantages of the invention will become apparent from the following detailed description, and from the appended claims, when considered in connection with the accompanying drawings, wherein like reference numerals designate like or equivalent claims.

Figure 1:
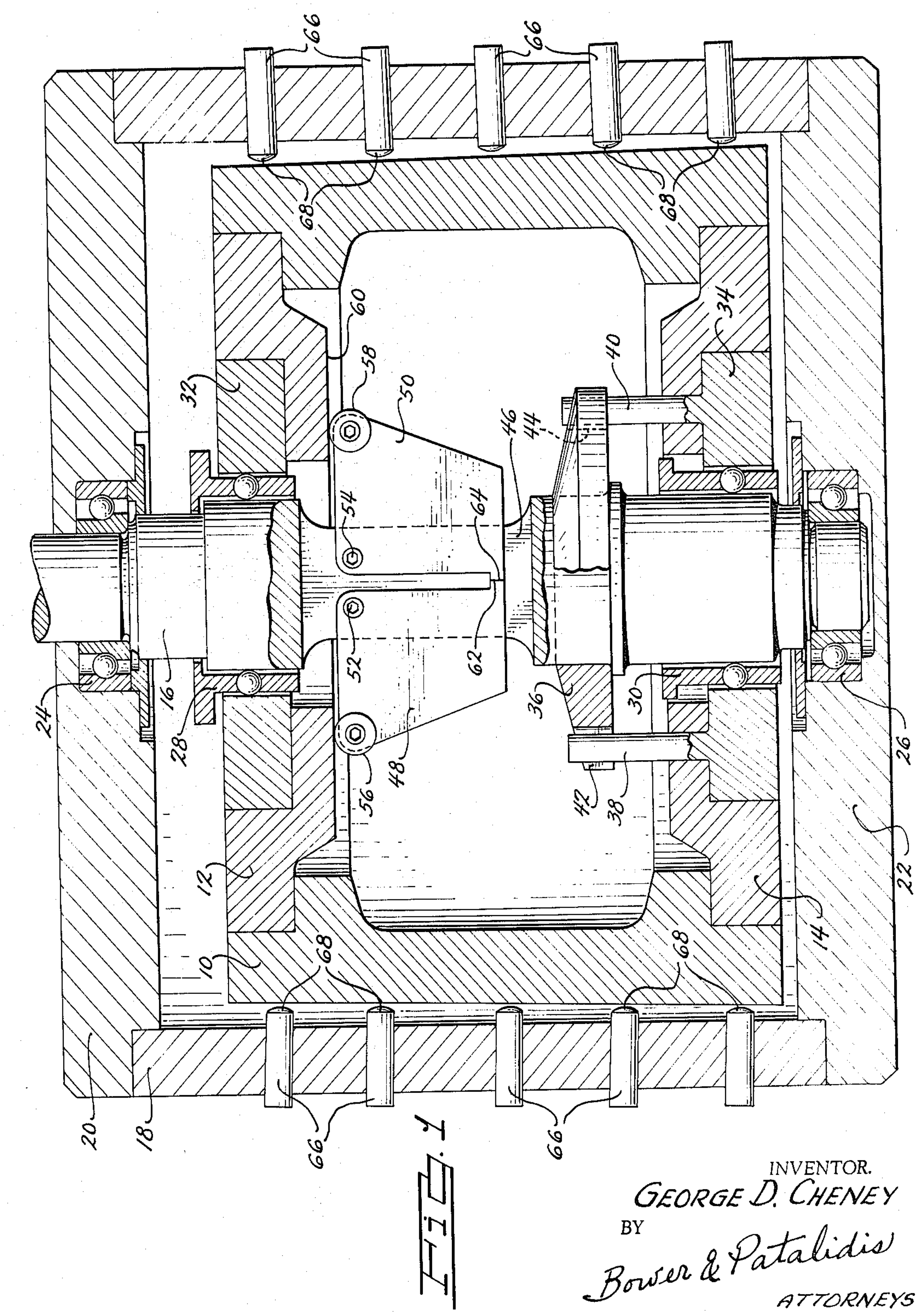
FIGURE 1 is a longitudinal cross sectional view substantially along the axis of a magnetic data storage drum embodying the principles of the invention.

Referring now to the drawings, and more particularly to FIGURE 1 thereof, a magnetic data storage drum according to the invention comprises a frusto-conical drum member 10 having a magnetizable record medium on its peripheral surface and being provided with end plates 12 and 14 on both its ends. The drum 10 substantially surrounds, and is concentric with, a shaft member 16 which is rotatably mounted in a housing 18, being supported therein by means of two housing end plates 20 and 22 and ball bearings 24 and 26. The shaft member 16 is capable of being rotated by any appropriate means (not shown) such as, for example, an electric motor.

The frusto-conical drum 10 which has a diameter, decreasing from its bottom to its top as viewed in FIGURE 1, is coaxially supported by the shaft member 16 and longitudinally slidable thereon by way of slide ball bearings 28 and 30, interposed between races 32 and 34 in the drum end plates 12 and 14 respectively and the outer surface of the shaft member 16. The drum is driven from the shaft member by means of a ring 36 integral with, or fastened to, the shaft member by any appropriate means and driving the drum end plate by way of pins such as 38 and 40 having one of their ends embedded in the end plate 14 and their other ends protruding through appropriate slots, such as 42 and 44 in the ring 36.

A slot 46 longitudinally disposed in the shaft member 16 contains two pendulum weight members 48 and 50 swingably mounted therein by means of pins 52 and 54. Pendulum weight member 48 carries a roller 56 on the end of its outwardly extending substantially horizontal upper side and pendulum weight member 50 carries a roller 58 disposed in the same fashion, rollers 56 and 58 supporting the underface 60 of the drum end plate 12. The weight of the drum resting on the rollers 56–58, when the drum is stationary or in a static condition, forces the pendulum weight members 48–50 to be applied one against the other at their abuting surfaces 62 and 64 situated at the bottom of the downwardly extending substantially vertical sides.

The housing 18 supports a plurality of transducer heads 66 which may be of the stationary type, as shown in the drawing, or which may preferably be of the non-contact fluid bearing or "flying" types described in the above mentioned patent applications.

At rest, the transducer head pole pieces 68 are a certain distance away from the record surface on the drum 10. When the drum is rotated and reaches a sufficient velocity, the centrifugal force acting upon the pendulum weight members 48–50 forces them to be pushed apart and to swing outwardly, rotating around their holding pins 52–54 and elevating the rollers 56–58. It can be seen that this action results in a force being transmitted by way of the rollers 56–58 to the underface 60 of the end plate 12, and this force lifts the drum 10 against its own weight. The drum is thus displaced vertically, as viewed in FIGURE 1, and, due to the conicity of its outer surface supporting the magnetizable medium, the latter is brought in close proximity to the pole pieces 68 of the transducer heads 66. The amount of lift of the drum and, consequently, the clearance between the transducer head pole pieces and the record surface is determined by the angular velocity of the drum. The amount of lift of the drum remains constant during operation, as magnetic data storage drums are generally driven by synchronous electric motors and constant velocity of displacement of the record medium under the transducer heads is a prerequisite of magnetic recording and playback.

Figure 2:
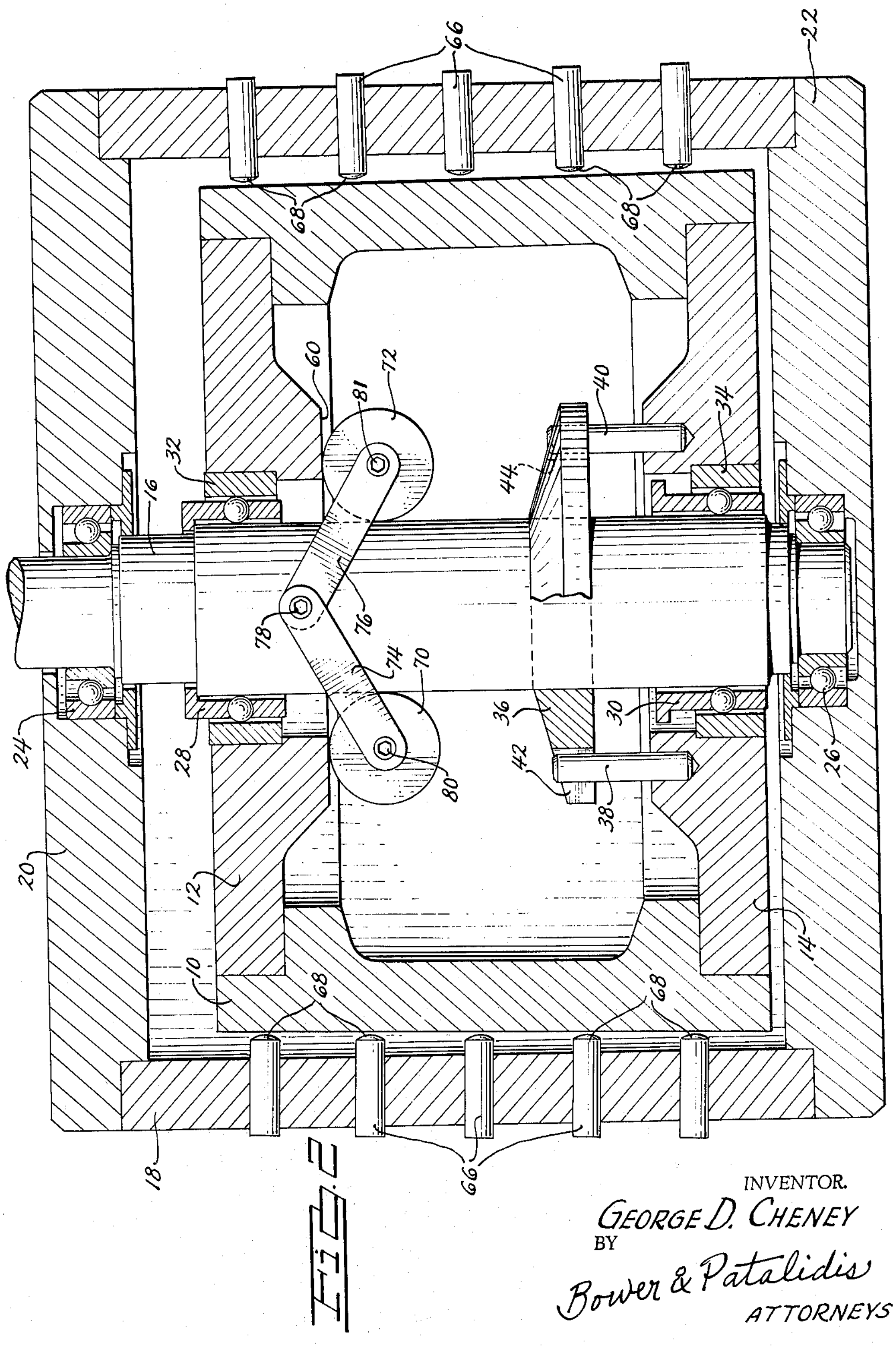
FIGURE 2 is a modification of the invention of FIGURE 1.

FIGURE 2 represents a rotatable drum and stationary housing assembly similar to the apparatus described in relation to FIGURE 1. The drum lifting and positioning device, however, is different and consists of a pair of heavy rollers 70 and 72, each of which is disposed in a symmetrical manner on one end of each one of pendulum arms 74 and 76. Each of the other ends of the pendulum arms is swingably supported by a common pin 78 affixed to the shaft member 16 perpendicularly to the axis thereof and substantially along a diameter thereof. The rollers 70 and 72 are capable of rotating around pins 80 and 81, on the end of pendulum arms 74 and 76 respectively, and when the drum is stationary, the rollers 70–72 support the weight of the drum by being wedged between the underface 60 of the drum end plate 12 and the side surface of the shaft member 16.

When the drum is rotated, and as soon as it reaches a predetermined velocity, the centrifugal force thus created causes the heavy rollers 70–72 to be displaced outwardly, thereby lifting the drum 12 by pushing against the underface 60 of the end plate 12 until the drum occupies a position whereby the pole pieces 68 of the transducer heads 66 are in close proximity to the record surface on the drum.

Figure 3:
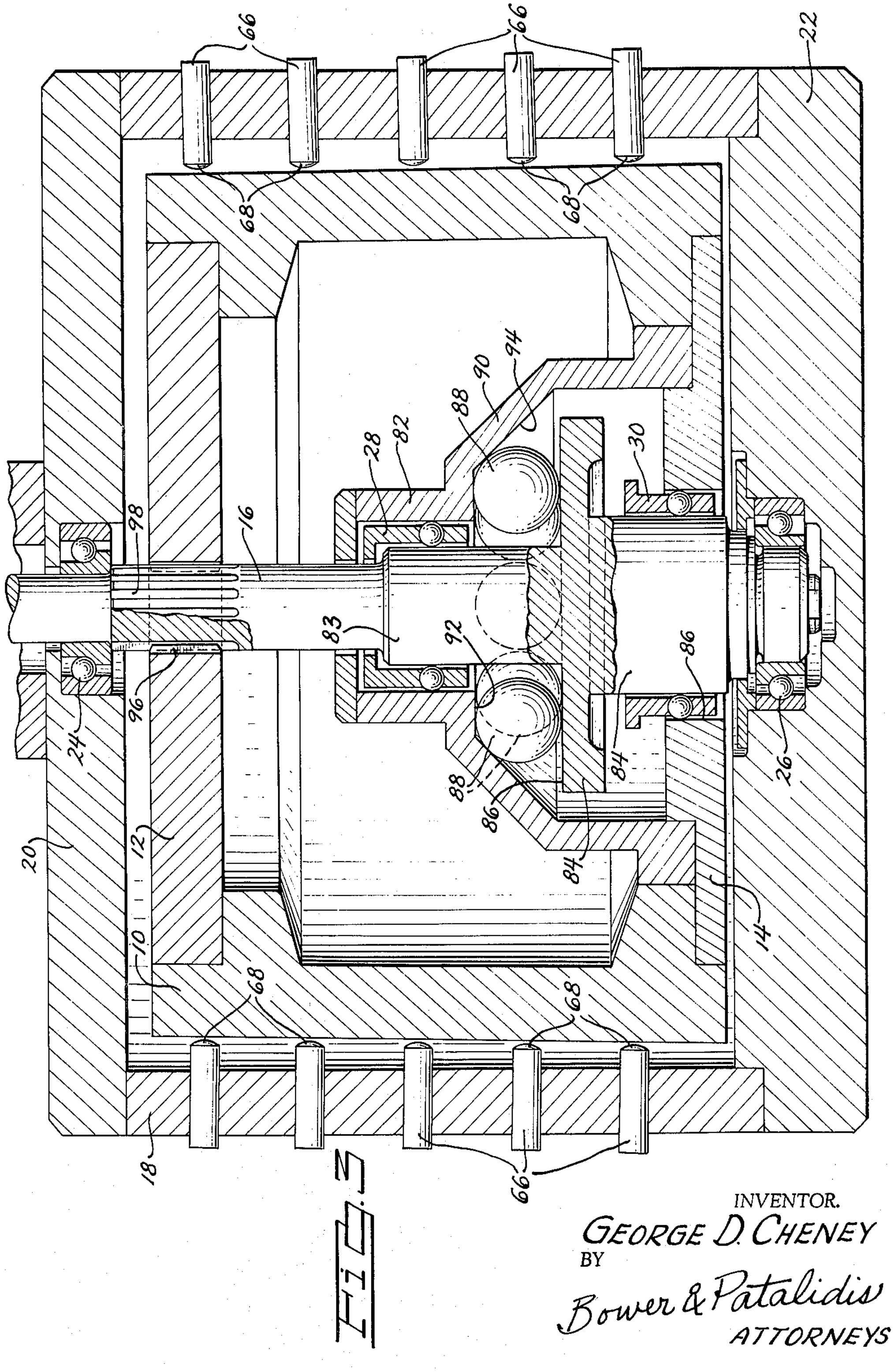
FIGURE 3 is another modification of the invention.

Referring now to FIGURE 3, another embodiment of the invention is illustrated which comprises a frusto-conical drum 10 having end plates 12 and 14, the drum being surrounded by a shroud or housing 18 provided with end plates 20 and 22. A shaft member 16 is rotatably carried by the housing end plates 20–22 by means of bearings such as ball bearings 24–26. The drum is allowed to be longitudinally slidable on the shaft member 16 by means of a slide ball bearing 28 coaxially disposed between an enlarged portion 83 of the shaft member 16 and a race 82 integral with, or affixed to, the inner side of the drum; a second slide ball bearing 30 is interposed between another enlarged portion 84 of the shaft member 16 and a cylindrical aperture 86 in the drum end plate 14.

The shaft member 16 is provided with a ring 84 integral therewith, or fastened thereon, the ring 84 having a face 86 disposed in a horizontal plane and supporting a plurality of substantially large and heavy balls 88. A frusto-conical cup-like member 90, integral with or affixed to the interior of the drum coaxially therewith, presents a ring-like face 92, substantially parallel to the face 86 of the ring 84. The balls 88, normally interposed between the face 86 of the ring 84 on the shaft and the face 92 on the cup-like element 90 on the drum, support the weight of the drum. The cup-like element 90 also presents an inclined truncated conical surface 94 for the purpose hereinafter explained.

The drum end plate 12 has an opening 96 through which passes the shaft member 16, and the shaft member 16 is provided with means for driving the drum, such means being represented in the drawing by a spline type of assembly 98 between the shaft member 16 and the end plate 12. It is evident that other means of driving the drum from the shaft member could be provided such as, for example, a pin or a slot-key assembly allowing longitudinal motion of the drum in relation to the shaft member.

When the shaft member 16 is rotated, by an electric motor (not shown), the drum is also rotated, being driven from the shaft member by the driving means provided. The balls 88 are projected outwardly by centrifugal force and support the drum by being wedged between the horizontal face 86 of the ring 84 and the inclined conical surface 94 of the cup-like element 90. It can thus be seen that the drum is lifted and longitudinally displaced to a position, depending from the drum angular velocity, which brings the record surface on the periphery of the drum in close proximity to the pole pieces 68 of the transducer heads 66.

Figure 4:
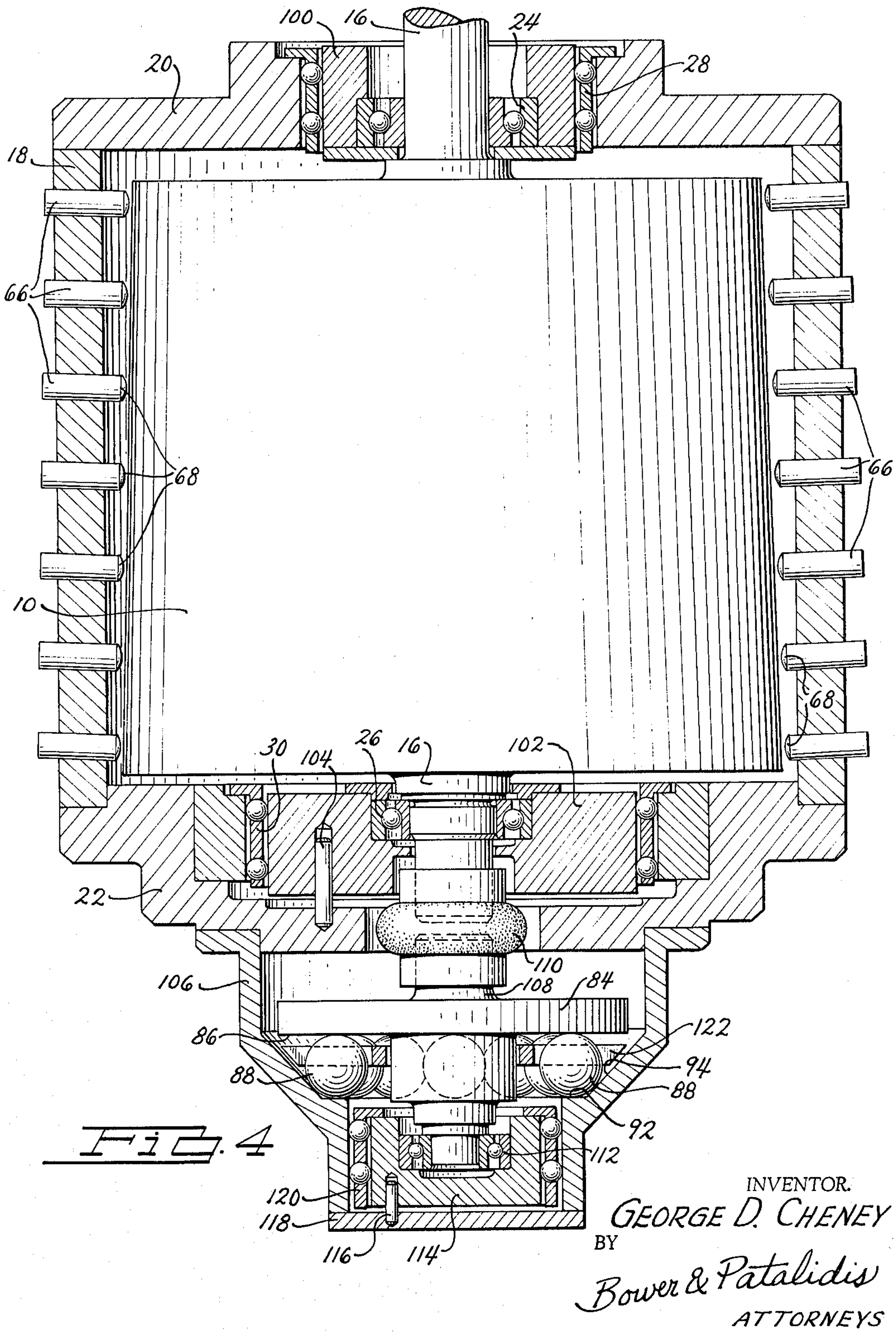
FIGURE 4 is a further modification of the invention.

FIGURE 4 represents a modification of the embodiment of FIGURE 3, wherein the drum positioning device is situated externally to the drum instead of being placed internally as in FIGURE 3. A frusto-conical drum 10 is affixed to a shaft 16 for rotation thereby. The shaft member 16 is carried by ball bearings 24 and 26 on both ends. The outer races of the ball bearings are mounted in ring-like members 100 and 102 which are in turn carried from the end plates 20 and 22 of the drum shroud or housing 18 by way of the slide ball bearings 28 and 30 respectively. Means, such as pin 104 shown in respect to ring-like member 102, enables the ring-like members 100 and 102 to be slidably and longitudinally displaceable, while being prevented from rotating when the shaft member 16 is rotated.

On the lower end of the housing end plate 22, there is disposed a cup-like cover 106 containing a trunnion member 108 supported by the lower end of the shaft member 16 by means of a flexible coupling 110. The other end of the trunnion 108 is supported by a ball bearing 112, the outer race of which is disposed in a retainer member 114 prevented from rotating by a pin 116 affixed to an end plate 118 closing the cup-like cover 106. A slide ball bearing 120 is disposed around the retainer member 114 to allow it to be slidably and longitudinally displaceable in relation to the cup-like cover 106. The cup-like cover 106 has a truncated conical surface 94 on its inside and a horizontal ring-face 92 supporting a plurality of balls 88 provided with a retainer 122. The trunnion member 108 is provided with a ring plate 84 integral therewith or fastened thereon. The ring plate 84 has a horizontal surface 86 resting against the balls 88, and the weight of the drum is supported by the ring-face 92 through the balls 88, the face 86, the balls 88 and the face 92 itself forming a thrust bearing for the drum shaft assembly.

When the drum is rotated, the balls 88 are thrust outwardly by the centrifugal force and are caused to climb the conical surface 94 of the cup-like cover 106, thereby axially displacing the ring 84 and the trunnion member 108, and consequently the shaft member 16 and the drum 10 attached thereon. For a predetermined rotational velocity of the drum, the drum is therefore longitudinally displaced to a position which establishes a close gap between the record surface on the drum and the transducer head pole pieces.

Figure 5:
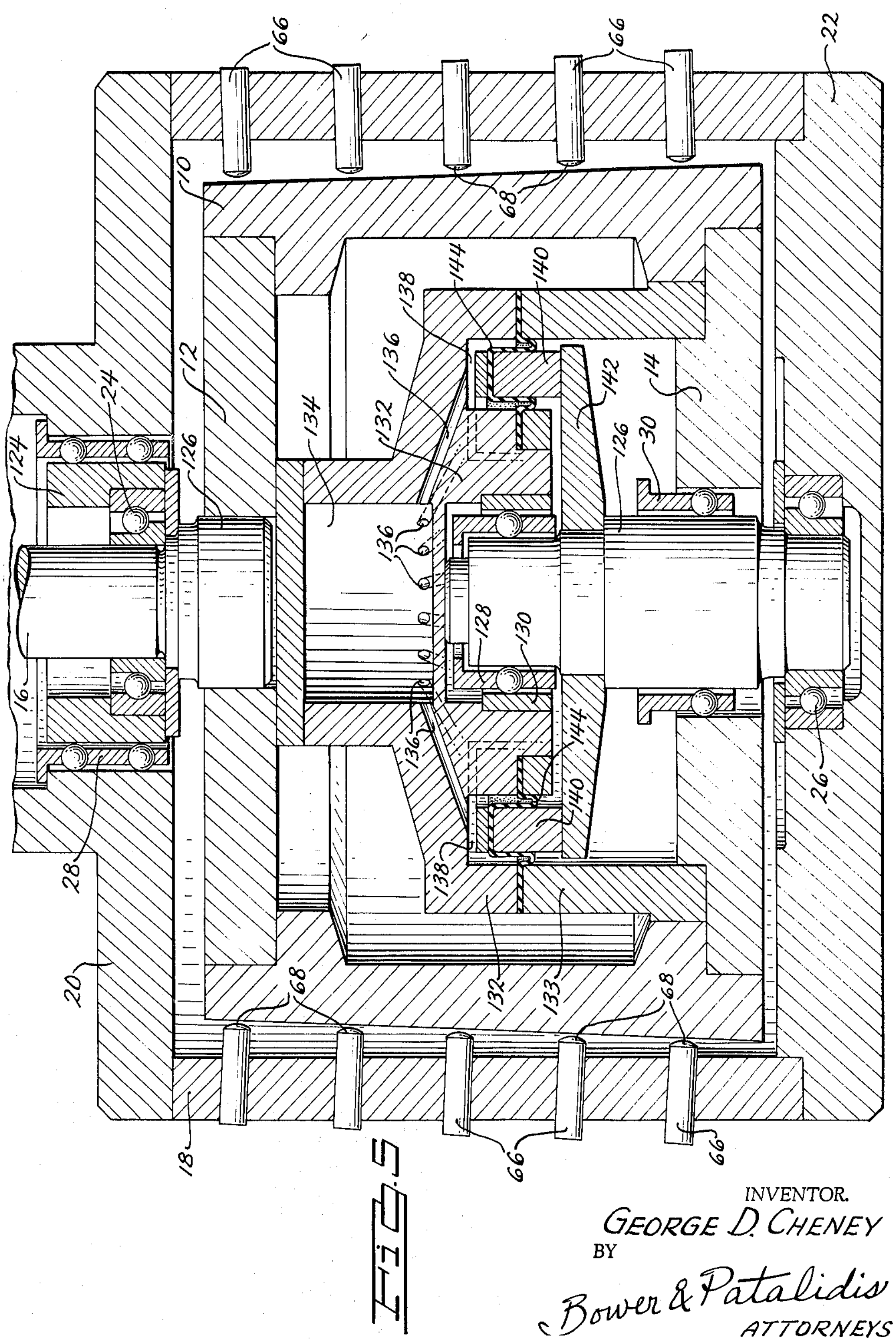
FIGURE 5 is a yet further modification of the invention.

FIGURE 5 represents a modification of the invention using fluid power to lift and position the drum, the fluid power energy being also produced by centrifugal force.

A drum 10, provided with end plates 12 and 14, is disposed within a shroud or housing 18 having end plates 20 and 22. A shaft member 16, capable of being rotated by means not shown, is supported by a ball bearing 24 affixed to a ring 124 which is in turn slidably mounted in the end plate 20 by means of the slide ball bearing 28. Means (not shown) normally prevents the ring 124 from rotating when the shaft member 16 is rotated but permits longitudinal motion of the ring and consequently of the shaft member 16 in relation to the housing. The end 126 of the shaft member 16 is press fitted, or otherwise fastened, to the drum end plate 12 and transmits to the drum the rotation of the shaft member.

The bottom end plate 22 of the housing supports a trunnion member 126 journaled therein by means of ball bearing 26. The trunnion 126 is not longitudinally movable in relation to the drum housing 18, but the drum 10 is longitudinally movable in relation to the trunnion member 126 by virtue of a ball slide bearing 30 being disposed between the trunnion member 126 and the drum end plate 14, and of another ball slide bearing 128 being disposed between the outer surface of the upper end of the trunnion member 126 and an inner race 130 coaxially disposed in a barrel 132 which is in turn affixed to the interior of the drum 10, concentrically therewith, by way of an annular member 133.

The barrel 132 is provided with a vertically axised cylindrical reservoir 134 normally filled with a liquid fluid. A plurality of conduits 136, radially disposed, places the periphery of the reservoir 134 in fluid communication with an annular space 138 disposed in the barrel 132. An annular member 140, carried by a ring plate member 142 integral with, or fastened to, the trunnion member 126, is disposed in the annular space 138. A bellows diaphragm 144 is mounted on the annular member 140, as shown in the drawing, and closes the annular space 138, thereby forming an expandable chamber supporting barrel 132 and consequently the drum 10 from the longitudinally fixed ring plate member 142.

When the drum 10 is rotated, the fluid contained in the reservoir 134 is caused to flow under pressure, under the effect of the centrifugal force, through the conduits 136 into the expandable chamber, and the drum 10 is thereby lifted in relation to the ring plate 142. Consequently, the drum is lifted in relation to the housing 18, and, due to the conicity of the drum the record surface on the drum is brought into close proximity to the pole pieces 68 of the transducer heads 66.

Instead of being provided with an annular member 140, the ring plate member 142 may alternately be provided with a plurality of piston members cooperating with cylinder chambers disposed in barrel 132, or vice-versa.

From the foregoing it will be readily apparent that there have been disclosed several arrangements for automatically lifting a frusto-conical drum from a position of rest affording a wide air gap between the record surface on the drum and the flux emitting pole pieces of transducer heads to an operative position where a narrow air gap is established between the record surface and the transducer head pole pieces. In some cases, no means need be provided for limiting the vertical travel of the drum under the influence of the centrifugal force. Because recording and playback of information is effected at a predetermined constant velocity of the record medium in relation to the transducer heads, the shaft member driving the drum is often driven from a synchronous electric motor rotating at a constant r.p.m., as long as the frequency of the supply current remains constant. However, in the event that it is found desirable to limit the vertical travel of the drum, this can be done by appropriate abutments provided on the shaft member, or by any other way as will be readily apparent to those skilled in the art. For example, in the embodiments of FIGURES 1 and 2, the bottom surface of ring 36 and the top surface of drum end plate 14 may be adapted to abut when the drum is in operation.

The invention has been described in terms of a centrifugal force actuated mechanism displacing the drum against the force of gravity. It is evident that, where it is required to operate a drum inverted, as compared to the herein illustrated examples, or in the event that the drum is to be made in such a way as to function in any position, such as in aircraft, a spring or any other biasing means may be used to urge the drum and longitudinally displace it to its normal position of rest affording a large clearance between the magnetizable surface and the transducer heads. The centrifugal force actuating mechanism of the invention will then operate in opposition to the spring or biasing force.

When a magnetic data storage drum constructed according to the teachings of the present invention is assembled, the magnetic transducer heads are loosely positioned in their mounting means on the housing. The drum is manually longitudinally displaced to a position slightly beyond the position it will occupy when rotated at its normal operational velocity. The transducer heads are adjusted in their mounting means until their pole pieces are touching the surface of the drum and they are secured in that position. In this fashion, all the transducer heads may be adjusted in one operation during static condition to provide a resulting predetermined air gap under dynamic condition. A similar procedure is also generally followed in regard to magnetic drum storage systems using transistor heads of the "flying" type.

Alternately, the transducer heads may be adjusted by inserting a frusto-conical mandrel or dummy drum in the housing and setting the heads with their pole pieces in contact with the surface of the dummy drum. The latter is then removed and the definitive drum member is mounted in position within the housing in the usual manner to complete the assembly. The dimensions of the dummy drum conform to the dimensions of the appropriate definitive drum member, taking in consideration however the air gap to be obtained and the growth of the drum member due to thermal and centrifugal expansion.

It is to be understood that the above described arrangements are illustrative of some of the applications of the principles of the invention. Numerous other arrangements may be devised by those skilled in the art without departing from the spirit and scope of the invention.

What is new is:

1. A magnetic data storage apparatus comprising:
a stationary housing with a vertical axis;
a plurality of magnetic transducers mounted on said housing with their flux emitting pole pieces substantially in an imaginary conical surface having a common axis with said housing;
a vertical rotatable shaft member disposed in said housing coaxially therewith;
a vertical tapered drum member disposed around said shaft member, said drum member having a recordable layer of magnetizable material on the peripheral surface thereof and having a diameter decreasing from bottom to top;
means driving said drum from said shaft member;
means mounting said drum for rotation within said housing and permitting said drum to be longitudinally movable along the axis thereof;
and automatic means actuated by centrifugal force operatively connected to said drum for elevating said drum by longitudinal displacement from a first position where the recordable layer on the drum member is substantially spaced from the transducer pole pieces during static condition to a second position whereby the recordable layer on the drum member is in close proximity to the transducer pole pieces during dynamic condition.

2. The apparatus of claim 1 wherein the means actuated by centrifugal force includes:

a pair of pendulum weight members symmetrically disposed within the drum member in a longitudinal slot in the shaft member;

said pendulum weight members having a normally substantially horizontal outwardly extending side carrying a roller on the outer end thereof and a normally substantially vertical downwardly extending side provided with abutting surfaces on the lower end thereof and being swingably attached to the shaft member about the apex of said substantially horizontal and vertical sides;

a surface portion dependent from the drum member and adapted to transmit the weight of said drum member to both of said rollers to force said pendulum weight members to normally occupy a position where both pendulum weight members rest against each other by their abutting surfaces when the shaft member is at rest;

whereby when said pendulum weight members are swung outwardly when the shaft member is rotated, their substantially horizontal sides occupy a position at an angle above a horizontal plane causing the rollers to lift the drum member of a predetermined amount for a predetermined rotational velocity of said shaft member.

3. The apparatus of claim 1 wherein the means actuated by centrifugal force includes:

a pair of pendulum arm members symmetrically disposed around the shaft member within the drum member;

one end of said pendulum arms being swingably attached to said shaft member, and the other end being provided with a substantially heavy roller;

a surface portion dependent from the drum member and transmitting the weight of the drum member to both of said rollers to cause said rollers to normally abut against the side surface of said shaft member when said shaft member is at rest;

whereby when said pendulum arms members are swung outwardly when the shaft member is rotated their roller supporting ends are elevated by centrifugal force action and cause the rollers to lift the drum member of a predetermined amount for a predetermined rotational velocity of said shaft member.

4. The apparatus of claim 1 wherein the means actuated by centrifugal force includes:

a ring member supported by the shaft member, said ring member having an upper horizontal flat surface;

a frusto-conical cup-like member fastened within the drum member coaxially therewith and substantially surrounding said ring, said cup-like member being provided with a ring-like portion parallel to the horizontal upper flat surface of the ring member supported by the shaft and a truncated conical surface portion having its smaller diameter proximate said ring-like portion;

a plurality of substantially large and heavy balls normally disposed between said upper flat surface and said ring-like portion when the shaft member is at rest;

whereby when the shaft member is rotated the balls are outwardly displaced by centrifugal force action and become wedged between said upper flat surface and said truncated conical surface causing the drum member to be longitudinally and upwardly displaced of a predetermined amount for a predetermined rotational velocity of said shaft member.

5. The apparatus of claim 1 wherein the means actuated by centrifugal force includes:

a stationary frusto-conical cup-like member coaxially fastened by its larger diameter portion to the lower end of the housing, said cup-like member being provided with a horizontal race portion at its lower end;

a trunnion member rotationally supported coaxially within said cup-like member and capable of being axially displaced;

a ring member carried by said trunnion member;

means supporting the drum member from said trunnion member;

a plurality of substantially large and heavy balls normally disposed between said ring member and said horizontal race portion when the drum member is at rest, said balls forming a thrust ball bearing when the drum member is at rest;

whereby the balls being thrown outwardly by centrifugal force action when the drum member is rotated are forced to climb the truncated conical surface longitudinally and upwardly displacing said ring member and consequently said drum member.

6. The apparatus of claim 1 wherein the means actuated by centrifugal force includes:

a trunnion rotatable in relation to the housing and coaxially disposed therein at the lower end of said housing, said trunnion being adapted to occupy a fixed longitudinal position;

an annular member carried by said trunnion within the drum member;

a corresponding annular space provided in said drum member;

a bellows diaphragm supported by said annular member and forming with said annular space an expendable chamber;

a fluid containing cylindrical reservoir in said drum member concentrically thereto and rotatable therewith;

radially disposed conduits leading from the periphery of said reservoir and placing said expandable chamber in fluid communication with said reservoir;

and said conduits supplying to said expandable chamber fluid under pressure when said drum member is rotated, the pressure of said fluid being caused by centrifugal force;

whereby the drum member is lifted by the expansion of said expandable chamber of a predetermined amount for a predetermined rotational velocity of said drum member.

7. A magnetic data storage apparatus comprising:

a housing;

a plurality of magnetic transducers mounted on said housing;

a shaft member disposed in said housing coaxially therewith;

a tapered drum member disposed around said shaft member, said drum member having a recordable layer of magnetizable material on the peripheral surface thereof;

means driving said drum from said shaft member;

means mounting said drum for rotation within said housing and permitting said drum to be longitudinally movable along the axis thereof;

means normally urging said drum longitudinally in the direction of greater diameter of said drum;

and automatic means actuated by centrifugal force operatively connected to said drum for positioning said drum by longitudinal displacement in the direction of smaller diameter of said drum to an operative position where the recordable layer on the drum member is in close proximity to the transducers.

8. The apparatus of claim 7 wherein the means actuated by centrifugal force includes:
a pair of pendulum weight members symmetrically disposed in a longitudinal slot in the shaft member;
each of said pendulum weight members being swingably attached to the shaft member by one end of a substantially radially extending side, the other end of which carries a roller;
means applying a transverse surface of the drum member upon both of said rollers to force said pendulum weight members to occupy a position where both pendulum weight members abut one against the other when the shaft member is at rest;
whereby when the shaft member is rotated said pendulum weight members are swung outwardly and force the rollers to axially displace the drum member of a predetermined amount for a predetermined rotational velocity of said shaft member.

9. The apparatus of claim 7 wherein the means actuated by centrifugal force includes:
a pair of pendulum arm members symmetrically disposed around the shaft member;
one end of said pendulum arm members being swingably attached to said shaft member and the other end being provided with a heavy roller;
means applying a transverse surface of the drum member upon both of said rollers to force said rollers to abut against the side surface of said shaft member when said shaft member is at rest;
whereby when the shaft member is rotated said pendulum arm members are swung outwardly and force the rollers to lift the member of a predetermined amount at a predetermined rotational velocity of said shaft member.

10. The apparatus of claim 7 wherein the means actuated by centrifugal force includes:
a ring member supported by the shaft member, said ring member having an upper flat surface;
a frusto-conical cup-like member supported by the drum and substantially surrounding said ring, said cup-like member being provided with a ring-like portion parallel to the upper flat surface of the ring member supported by the shaft and a truncated conical surface;
a plurality of substantially large and heavy balls normally disposed between said upper flat surface and said ring-like portion when the shaft member is at rest;
whereby when the shaft member is rotated the balls are thrown outwardly and become wedged between said upper flat surface and said truncated conical surface elevating the drum member of a predetermined amount at a predetermined rotational velocity of said shaft member.

11. The apparatus of claim 7 wherein the means actuated by centrifugal force includes:
a ring member supported by the drum member, said ring member having a lower flat surface;
a frusto-conical cup-like member supported by the housing and substantially surrounding said ring member and presenting a ring-like portion parallel to the lower flat surface of said ring member;
a plurality of substantially large and heavy balls normally disposed between said lower flat surface and said ring-like portion when the drum member is at rest;
whereby said balls form a thrust ball bearing when the drum member is at rest and are thrown outwardly when the drum member is rotated, being forced to climb the truncated conical surface longitudinally and upwardly displacing said ring member and consequently said drum member.

12. The apparatus of claim 7 wherein the means actuated by centrifugal force includes:
a trunnion rotatable in relation to the housing and coaxially disposed therewith;
an expandable fluid chamber interposed between said trunnion and the interior of the drum member;
a fluid containing cylindrical reservoir in said drum member concentrically thereto and rotatable therewith;
radially disposed conduits leading from the periphery of said reservoir and placing said expandable chamber in fluid communication with said reservoir;
whereby when the drum member is rotated the fluid contained in the reservoir is forced by centrifugal force to flow into said expandable chamber thereby longitudinally displacing the drum member by the expansion of said expandable chamber of a predetermined amount for a predetermined rotational velocity of said drum member.

13. A magnetic data storage apparatus comprising:
a recordable magnetizable surface;
tapered rotatable support means for said surface;
means for rotating said support means;
bearing means for said support means permitting rotation around an axis and linear longitudinal displacement along said axis;
means for writing information on said magnetizable surface and reading therefrom;
and actuating means operatively connected to said support means for longitudinally displacing said rotatable support means in the direction of smaller diameter against a biasing force urging said support means in the direction of larger diameter, said actuating means being responsive to centrifugal force.

14. The apparatus of claim 13 wherein the actuating means comprises pendulum weight means displaceable by centrifugal force.

15. The apparatus of claim 13 wherein the actuating means comprises thrust bearing means longitudinally expandable by centrifugal force.

16. The apparatus of claim 13 wherein the actuating means comprises expandable fluid chamber means in communication with a supply of fluid having a pressure dependent from the rotational velocity of the recordable surface support means.

References Cited by the Examiner

UNITED STATES PATENTS

| | | | |
|---|---|---|---|
| 2,851,894 | 9/1958 | Seyfarth | 73—523 |
| 2,863,655 | 12/1958 | Frederick | 73—551 |
| 3,068,455 | 12/1962 | Trimble | 340—174.1 |
| 3,098,394 | 7/1963 | Adler | 73—551 |

BERNARD KONICK, *Primary Examiner.*

IRVING L. SRAGOW, *Examiner.*

M. K. KIRK, V. CANNEY, *Assistant Examiners.*